(12) United States Patent
Han et al.

(10) Patent No.: US 11,549,361 B2
(45) Date of Patent: Jan. 10, 2023

(54) SETTING A WELLBORE CASING IN A SALT FORMATION

(71) Applicant: Saudi Arabian Oil Company, Dhahran (SA)

(72) Inventors: Yanhui Han, Houston, TX (US); Younane N. Abousleiman, Norman, OK (US)

(73) Assignee: Saudi Arabian Oil Company, Dhahran (SA)

( * ) Notice: Subject to any disclaimer, the term of this patent is extended or adjusted under 35 U.S.C. 154(b) by 379 days.

(21) Appl. No.: 16/922,699

(22) Filed: Jul. 7, 2020

(65) Prior Publication Data

US 2022/0010667 A1 Jan. 13, 2022

(51) Int. Cl.
| | |
|---|---|
| *E21B 47/007* | (2012.01) |
| *E21B 44/06* | (2006.01) |
| *E21B 49/00* | (2006.01) |
| *E21B 7/20* | (2006.01) |
| *G01V 99/00* | (2009.01) |

(52) U.S. Cl.
CPC ............ *E21B 47/007* (2020.05); *E21B 44/06* (2013.01); *E21B 49/005* (2013.01); *E21B 49/006* (2013.01); *G01V 99/005* (2013.01); *E21B 7/20* (2013.01); *G01V 2210/6224* (2013.01)

(58) Field of Classification Search
CPC ...... E21B 47/007; E21B 44/06; E21B 49/005; E21B 49/006; E21B 7/20; E21B 43/10; G01V 99/005
See application file for complete search history.

(56) References Cited

U.S. PATENT DOCUMENTS

| | | |
|---|---|---|
| 10,345,764 B2 | 7/2019 | Early et al. |
| 10,678,966 B2 * | 6/2020 | Samuel ................. G05B 17/02 |

(Continued)

FOREIGN PATENT DOCUMENTS

WO WO2017106513 6/2017

OTHER PUBLICATIONS

Chuanliang et al., "Wellbore stability analysis and its application in the Fergana basin, central Asia" Journal of Geophysics and Engineering 11.1, Feb. 2014, 9 pages.

(Continued)

*Primary Examiner* — Manuel A Rivera Vargas
(74) *Attorney, Agent, or Firm* — Fish & Richardson P.C.

(57) ABSTRACT

A method for setting a wellbore casing in a subterranean formation is described. The method includes: drilling a test wellbore in the subterranean formation; generating a density profile of a plurality of geological layers above a salt formation in the subterranean formation based on observations from the test wellbore; calculating an overburden stress imposed on the salt formation by weight of overlying formation based on the density profile of the plurality of geological layers; performing creep mechanical behavior tests on core samples from the salt formation to generate a strain-time curve for the salt formation; calibrating multiple analytical creep models with mechanical properties of the salt data generated by the creep mechanical behavior tests; implementing a wellbore closure model based on a best-fit analytical model and mechanical properties of the multiple analytical creep models; drilling a well; and setting a casing through the salt formation.

20 Claims, 6 Drawing Sheets

(56) References Cited

U.S. PATENT DOCUMENTS

| | | | |
|---|---|---|---|
| 11,078,786 B2* | 8/2021 | Tiwari | G01V 11/00 |
| 11,326,447 B2* | 5/2022 | Khan | E21B 49/003 |
| 2003/0034156 A1* | 2/2003 | Gondouin | E21B 7/065 |
| | | | 166/117.5 |
| 2016/0258246 A1* | 9/2016 | Jandhyala | C09K 8/42 |
| 2019/0362348 A1* | 11/2019 | Wong | G06Q 20/02 |

OTHER PUBLICATIONS

Gholami et al., "A methodology for wellbore stability analysis of drilling into presalt formations: A case study from southern Iran" Journal of Petroleum Science and Engineering 167, Aug. 2018, 249-261, 28 pages.

Maia et al., "Triaxial creep tests in salt applied in drilling through thick salt layers in Campos basin-Brazil" SPE/IADC Drilling Conference. OnePetro, Feb. 2005, 9 pages.

PCT International Search Report and Written Opinion in International Appln. No. PCT/US2021/040616, dated Oct. 22, 2021, 17 pages.

Abousleiman et al., "Poroviscoelastic analysis of borehole and cylinder problems," Acta mechanica, 119(1-4), pp. 199-219, Mar. 1996, 21 pages.

Carcione et al., "Theory of borehole stability when drilling through salt formations," Geophysics, vol. 71, No. 3, May-Jun. 2006, 17 pages.

Dropek et al., "Pressure -temperature creep testing as applied to a commercial rock salt," Union Carbide, Office of Waste Isolation, prepared for the U.S. Energy Research and Development Administration, Jun. 1976, 54 pages.

Infante and Chenevert, "Stability of boreholes drilled through salt formations displaying plastic behaviour," SPE Drilling Engineering, vol. 4, No. 1, Mar. 1989, 9 pages.

Taheri et al., "Investigation of rock salt layer creep and its effects on casing collapse," International Journal of Mining Science and Technology, 2020, 9 pages.

Wang and Samuel, "Geomechanical Modelling of Wellbore Stability in Salf Formations, 3D Geomechanical Modelinng of Salf-Creep Behavior on Wellbore Casing for Presalt Reservoirs," SPE Drilling and Completion, 31(04): 261-272, Sep. 2013, 13 pages.

Weijermars et al., "Closure of open wellbores in creeping salt sheets" Geophysical Journal International, 196, 279-290, 2014, 12 pages.

* cited by examiner

SETTING A WELLBORE CASING IN A SALT FORMATION

TECHNICAL FIELD

The present disclosure generally relates to a method for estimating the time window for setting a wellbore casing in a subterranean formation, more particularly in a salt formation.

BACKGROUND

Salt formations exhibit viscoelastic behavior making them continuously deform under pressure even if they are initially stable. This deformation is called creep and occurs over time once the salt has been disturbed into a non-hydrostatic stress state. During drilling, creep begins as soon as the salt formation is penetrated and occurs as a result of excavation of a borehole in the salt formation and the differential stresses caused by the weight of overlying formation and the stress release due to remove of formation from the borehole. Completions in salt formations can be difficult because of this creep behavior that the salt formations exhibit. Mud designed using conventional methods inside the wellbore does not stop creep of the salt formation and wellbore closure can occur. This is one of the major challenges encountered while drilling in salt formations.

At time of drilling, the weight of the mud in the wellbore is sufficient to maintain the stability of the drilled well. However, the wellbore diameter is gradually reduced while the mud pressure remains the same after drilling. In some salt formations, the wellbore diameter can contract by inches in only few hours. As a result, the borehole size reduces significantly and another drilling operation may be necessary to set a casing.

SUMMARY

This specification describes methods for setting wellbore casings in subterranean formations that combine in-situ stress measurements, laboratory experiments, and creep model calibration of test results from samples of salt formations. The method allows evaluation of wellbore closure rate associated with creep and estimation of a time window for setting a wellbore casing in a subterranean formation. It is important to characterize the creep rate of the salt formation to be drilled because different salt formations have different rates of creep and/or different viscoelastic time-deformation behavior. Accurately characterizing the deformation behavior of the salt formation makes it possible to estimate a time window for setting a casing before wellbore closure takes place.

These methods estimate a time window for setting a wellbore casing in a subterranean formation that, for example, includes a salt formation. The methods use overburden stress due layers overlying the salt formation as a proxy for horizontal stresses in the salt formation. The overburden stress can be calculated based a density profile of the overlying layers.

In some implementations, the methods include drilling a test wellbore in the subterranean formation. During drilling, observations of layers through which the wellbore passes are performed and samples (e.g., core samples) of the layers are collected. A density profile of the geological layers above the salt formation can be generated based on the observations and collected samples. In some implementations, a density profile of the overlying layers already exists and is used as input.

The time-dependent viscosity characteristics of salt formations can be reflected by various analytical models. These methods incorporate multiple analytical models that, along with laboratory data, are integrated into one approach that enables an accurate time estimate for setting a wellbore casing in the deep salt horizon during drilling. These methods allow drilling engineers and field planners to guide the field operation based on quantitatively generated parameters. The quantitative parameters provide the drilling engineers an accurate understanding of the relationship between the completion time (i.e., a casing-setting time window) and the time-dependent mud density that they are required to maintain before the casing is fully set and the operation is completed.

In some aspects, a method for setting a wellbore casing in a subterranean formation includes: drilling a test wellbore in the subterranean formation; generating a density profile of a plurality of geological layers above a salt formation in the subterranean formation based on observations from the test wellbore; calculating an overburden stress imposed on the salt formation by weight of overlying formation based on the density profile of the plurality of geological layers; performing creep mechanical behavior tests on core samples from the salt formation to generate a strain-time curve for the salt formation; calibrating multiple analytical creep models with mechanical properties of the salt data generated by the creep mechanical behavior tests; implementing a wellbore closure model based on a best-fit analytical model and mechanical properties of the multiple analytical creep models to generate a relationship between drilling mud weight and casing time window for the salt formation; and drilling a well extending through the salt formation and setting a casing through the salt formation within a casing time window based on a weight of a drilling mud used to drill the well.

In some aspects, a method for determining a time window for setting a wellbore casing in a salt formation includes: calculating an overburden stress imposed on the salt formation by weight of overlying formations based on a density profile of a plurality of geological layers above the salt formation; performing creep mechanical behavior tests on core samples from the salt formation to generate a strain-time curve for the salt formation; calibrating multiple analytical creep models with mechanical properties of the salt data generated by the creep mechanical behavior tests; implementing a wellbore closure model based on a best-fit analytical model and mechanical properties of the multiple analytical creep models to generate a relationship between drilling mud weight and casing time window for the salt formation; and selecting a drilling mud based in part on a time required to set the casing through the salt formation.

Embodiments of the method for setting a wellbore casing in a subterranean formation can include one or more of the following features.

In some embodiments, the method of calculating the overburden stress includes relating the density profile of the plurality of geological layers with an underground depth z and acceleration of gravity g. In some cases, calculating of the overburden stress includes setting a reference depth to zero. In some cases, calculating of the overburden stress includes setting a maximum horizontal principal stress and a minimum horizontal principal stress to be equal to the overburden stress.

In some embodiments, performing the creep mechanical behavior tests on the core samples includes defining an in-situ stress and a temperature to impose deformation on the salt formation.

In some embodiments, performing the creep mechanical behavior tests on the core samples includes defining an isotropic confining stress in an axial and in a radial direction. In some cases, performing the creep mechanical behavior tests on the core samples includes increasing the axial stress in a step-wise pattern.

In some embodiments, calibrating the multiple analytical creep models includes selecting models with springs and dashpots. In some cases, multiple analytical creep models include a Kelvin model, a Maxwell model, a Burgers model, a modified Burgers model, a Zener model, and a modified Zener model.

In some embodiments, implementing a wellbore closure model includes defining a difference between an in-situ stress and the mud weight as a deviatoric stress.

In some embodiments, drilling the well extending through the salt formation includes selecting the drilling mud based in part on a time required to set the casing through the salt formation.

The method described in this specification can accurately obtain a time window dependent on mud weight or mud density for setting a casing into a salt formation while correlating experimental data of the creep of salt formations and related theoretical models. These methods enable completion engineers to calculate the time window for setting a casing related to creep behavior of salt formations more accurately than methods that rely on creep behavior of salt formations alone without quantitative analysis.

The details of one or more embodiments of these methods are set forth in the accompanying drawings and the description below. Other features, objects, and advantages of these methods will be apparent from the description and drawings and from the claims.

DETAILED DESCRIPTION

This specification describes methods for setting a casing in a wellbore that extends through a salt layer in a subterranean formation that combine in-situ stress measurements, laboratory experiments, and creep model calibration of test results from salt samples. These methods allows evaluation of wellbore closure rate and estimation of critical time window for setting a wellbore casing in a subterranean formation.

These methods estimate a time window for setting a wellbore casing in a subterranean formation that, for example, includes a salt formation. The methods use overburden stress due layers overlying the salt formation as a proxy for horizontal stresses in the salt formation. The overburden stress can be calculated based a density profile of the overlying layers.

The time-dependent viscosity characteristics of salt formations can be reflected by various analytical models. These methods incorporate multiple analytical models that, along with laboratory data, are integrated into one approach that enables an accurate time estimate for setting a wellbore casing in the deep salt horizon during drilling. These methods allow drilling engineers and field planners to guide the field operation based on quantitatively generated parameters. The quantitative parameters provide the drilling engineers an accurate understanding of the relationship between the completion time (i.e., a casing-setting time window) and the time-dependent mud density that they are required to maintain before the casing is fully set and the operation is completed.

Figure 1:
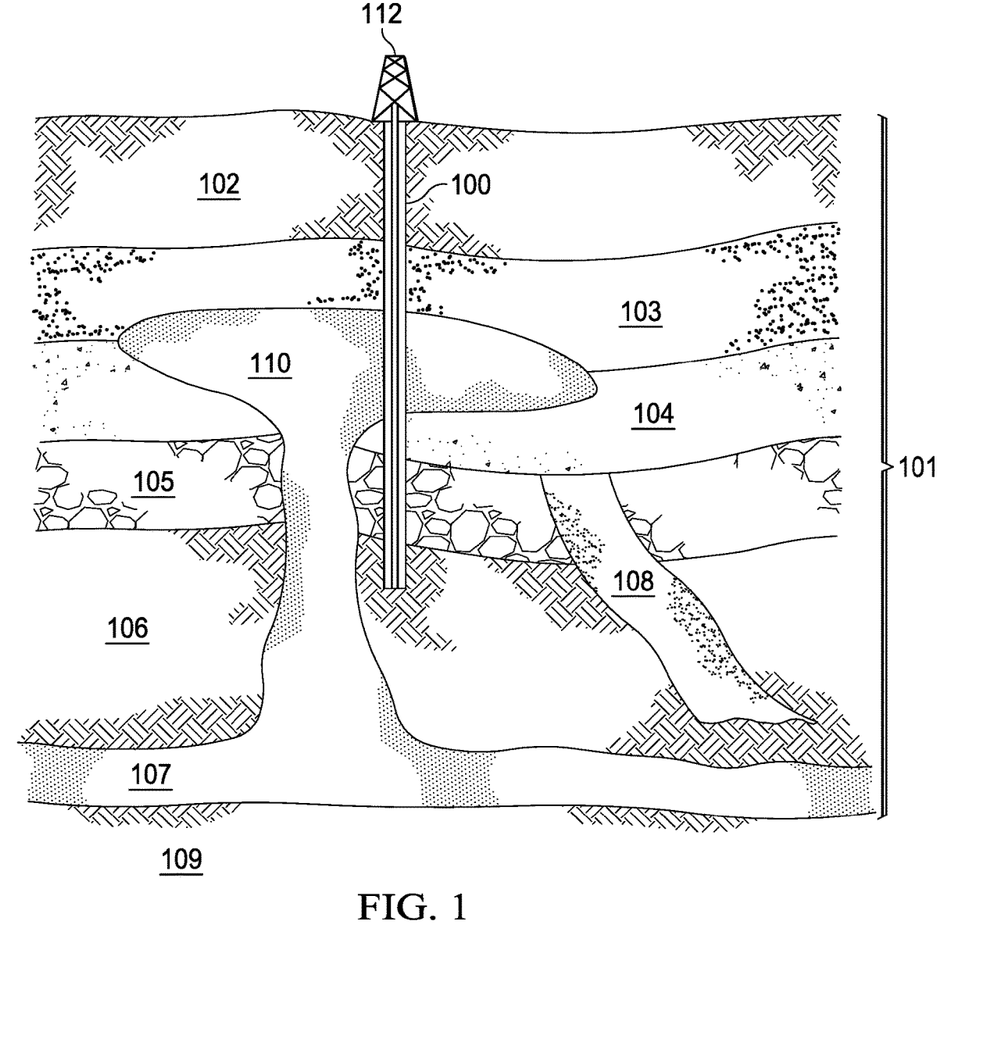
FIG. 1 is a schematic view of a wellbore being drilled through a salt layer in a subterranean formation.

FIG. 1 is a schematic view of a wellbore 100 being drilled into a subterranean formation 101. The subterranean formation 101 includes multiple geological layers 102, 103, 104, 105, 106 overlying a salt layer 107 and another geological layer 109 under the salt layer 107. As previously discussed, salt has the ability to change shape and flow when placed under enough differential pressure. In the subterranean formation 101, a salt formation 110 has developed because pressure of the overlying layers 102, 103, 104, 105, 106 on the salt layer 109 was high enough to cause the salt layer 109 to intrude the overlying formations. The pressure was great enough to overcome obstacles including the weight of overlying layers 102, 103, 104, 105, 106, the strength of overlying layers, frictional forces, and the force of gravity resisting uplift. The salt layer 107 was under enough pressure to intrude through an area of weakness or instability in several of the overlying layers. The salt formation 110 developed once the salt rose to a height where equilibrium conditions existed.

After drilling is complete, the well 100 is prepared for production by a process that can include steps such as preparing the bottom of the hole to the required specifications, running in production tubing and associated down hole tools, and running in and cementing a casing. During drilling, the weight of the mud in the wellbore is sufficient to maintain stability of the drilled well. After the well 100 has been drilled, the well 100 would eventually close in on itself if the drilling fluids be removed even in the more stable geological layers 102, 103 overlying the salt formation 110. However, drilling passes through the salt formation 110, creep becomes an issue. Due to the properties of salt formations, the borehole size reduction of the well 100 happens more quickly and occurs even in the presence of the drilling fluids. It is important to run in and cement the casing before the well narrows to the point of limiting access for installation of the casing.

In some salt formations, the wellbore diameter can contract by inches in only few hours due to creep behavior of the salt formation formed from the instability of the salt. Wellbore closure is a major challenge during drilling and can require additional expensive and time-consuming drilling operations for setting of the casing. Understanding the wellbore environment and having accurate time window for setting a wellbore casing can avoid the need for additional drilling operations. The integrated approach of in-situ stress measurements, laboratory experiments, and creep model calibration of test results from salt samples under creep enable accurate estimation of a time window for setting a wellbore casing in a subterranean formation.

Figure 2:
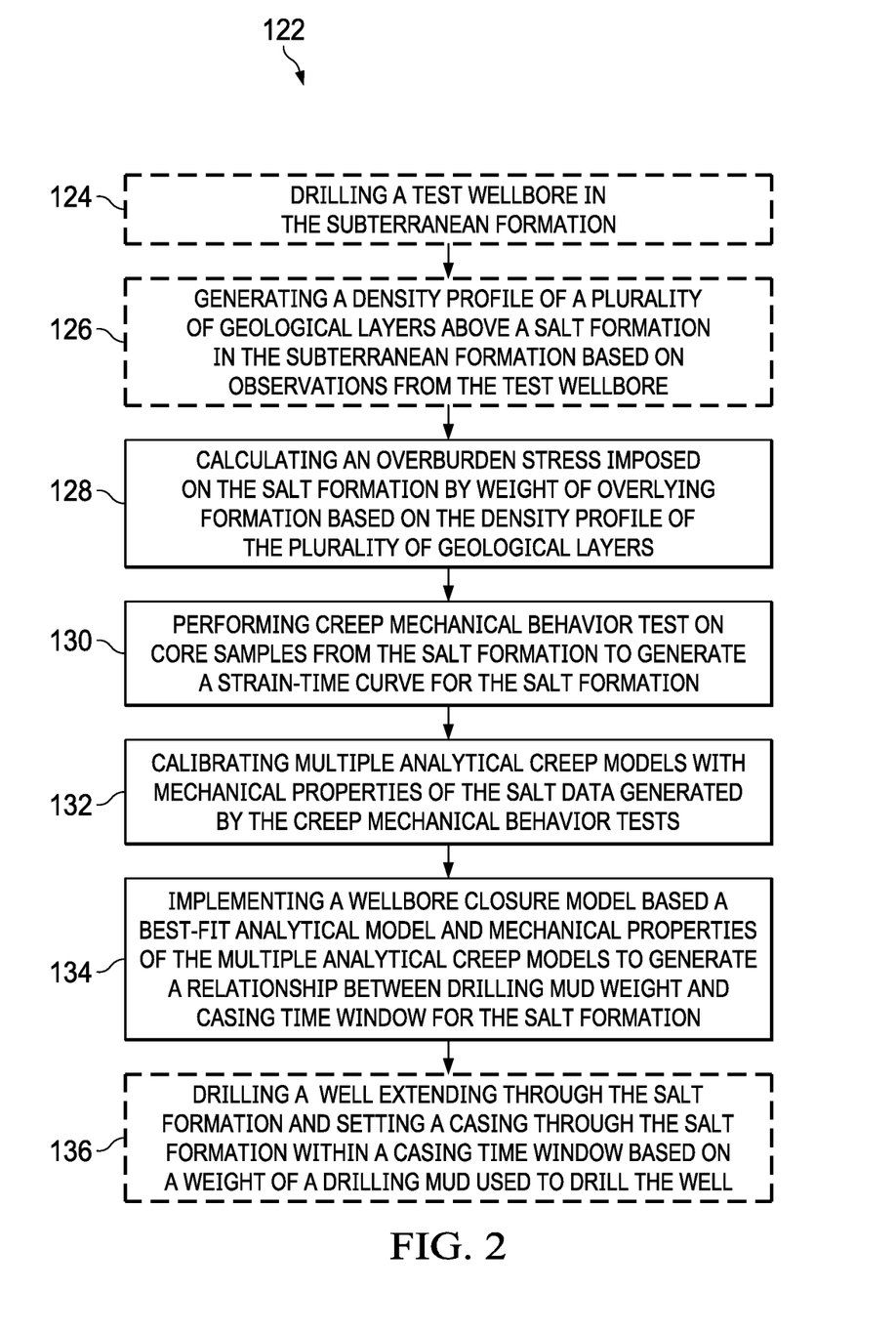
FIG. 2 is a flowchart representing a method for setting a wellbore casing in a salt formation.

FIG. 2 is a flowchart representing a method 122 for setting a wellbore casing in a salt formation. The following discussion of the method describes the steps with reference to the formation 101.

The method 122 is based an approach to estimating a time window for setting a wellbore casing in a subterranean formation that, for example, includes a salt formation. The method uses overburden stress due to the layers overlying the salt formation as a proxy for horizontal stresses in the salt formation. The overburden stress can be calculated based a density profile of the overlying layers.

In some implementations, the method 122 includes drilling a test wellbore in the subterranean formation (step 124). During drilling, observations of layers through which the wellbore passes are performed and samples (e.g., core samples) of the layers are collected. A density profile of the geological layers above the salt formation can be generated based on the observations and collected samples (step 126). These steps are optional because, in some situations, a density profile of the overlying layers already exists and can be used as input. For example, the layers 102, 103 overlying the salt formation 110 exert pressure on the salt formation 110 and influence the rate of creep in the salt formation 110. If drilling continued and the well 100 extended through the salt layer 107 into the underlying layer 109, all of the layers 102, 103, 110, 104, 105, 106 above that portion of the salt layer 107 exert pressure on the salt layer 107 and influence the rate of creep in the salt layer 107.

The density profile is used to calculate an overburden stress imposed on the salt formation by the weight of overlying formation based on the density profile of the plurality of geological layers (step 128). The overburden pressure at a depth (D) can be calculated from the density profile of the geological layers using Equation 1:

$$\sigma_V = \sigma_0 + g\int_{D_0}^{D} \rho(z)dz \quad (1)$$

where $\rho(z)$ is the density of the overlying layer at underground depth z, g is the acceleration of gravity, $\sigma_0$ is the vertical stress at the reference depth $D_0$, for example, at the ground surface ($D_0 = 0$). The stress state inside a salt formation 110, because of its limited capacity to withstand shear stress in any direction, tends to reach a hydrostatic stress state over a long geological ages. The method 122 is based on the assumption that that both maximum and minimum horizontal principal stresses are equal to the overburden pressure:

$$\sigma_H = \sigma_h = \sigma_V \quad (2)$$

Creep mechanical behavior tests are performed on core samples from the salt formation to generate a strain-time curve for the salt formation (step 130). To predict the creep mechanical behavior of salt formation 110 in the subsurface, these tests are performed under conditions that simulate the field conditions that have primary influence on the creep behavior of the salt formation 110. In-situ stress and temperature are two primary factors affecting the viscoelastic/viscoplastic time-dependent deformation of salt formation, so the creep test is conducted under the same stress and temperature conditions as those present in the field environment. The creep tests can be conducted using the approach described in "Stability of boreholes drilled through salt formations displaying plastic behavior" by Infante and Chenevert, *SPE Drilling Engineering* 4:1 (1989), incorporated in this disclosure in its entirety by reference.

Figure 3A:
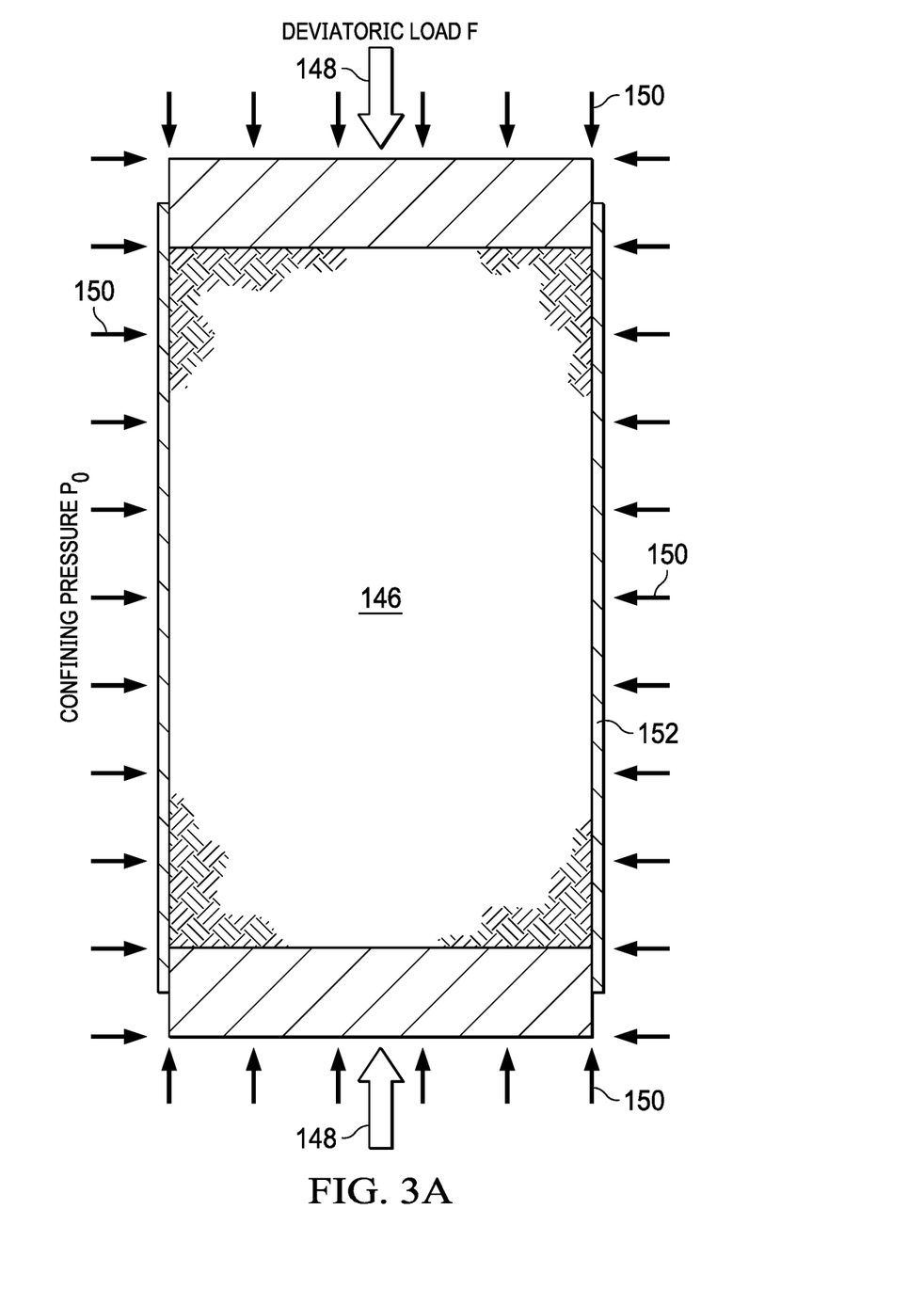
FIGS. 3A and 3B schematically illustrate a creep test being performed on a sample of a salt formation.
Figure 3B:
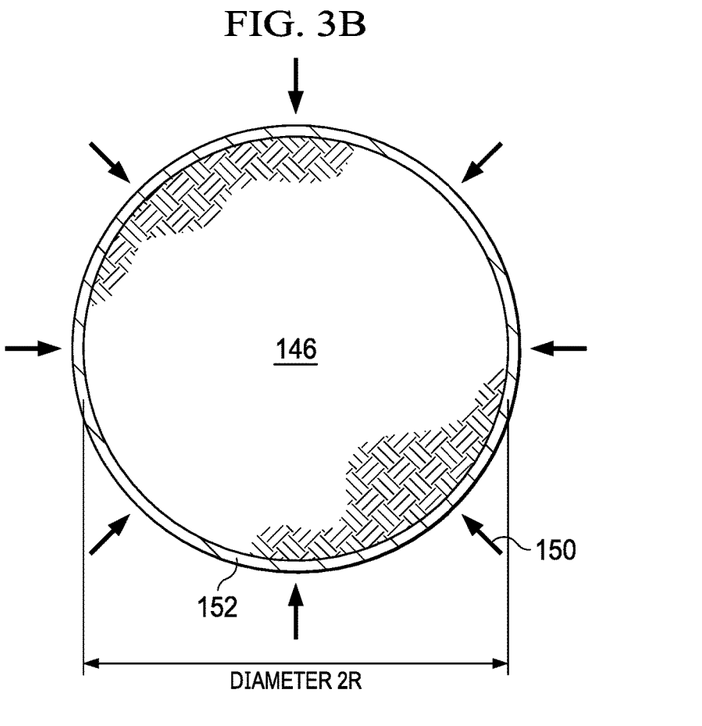

FIGS. 3A and 3B schematically illustrate the concept of a creep test being performed on a sample 146 of a salt formation 110. The sample 146 has diameter d=2R, where R represents the radius of the sample 146. The sample 146 has impermeable jacket 152 extending around the perimeter of the sample 146. A confining load 150 is applied in both axial and radial directions on the sample 146. The confining load is applied based on the overburden pressure calculated using Equation 1. The axial load is then step-wise increased by a deviatoric load 148. The deviatoric load 148 generates a deviatoric stress that will initiate creep behavior in the sample 146 and allows measurement of time-deformation or strain rate.

Figure 4:
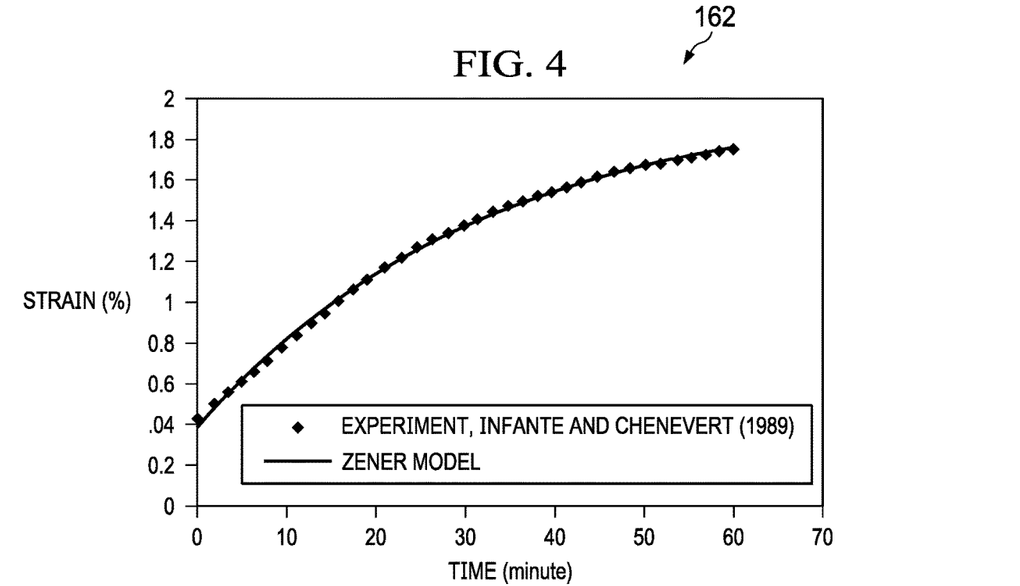
FIG. 4 is an example of a distribution curve of a measured strain rate of a salt formation.

FIG. 4 is an example of a distribution curve 162 of a measured strain rate of a salt formation. The test conditions were: temperature set to 225° F. (107° C.) and the confining pressure (i.e., in-situ stress) set to 13,200 psi (91 MPa). The test conditions simulated the real-time operating conditions imposed on the salt formation during drilling. The sample 146 was stabilized for one hour under an isotropic stress condition. The confining stress was reduced to allow axial creep to propagate for one hour.

Referring again to FIG. 2, the method 122 includes calibrating multiple analytical creep models with mechanical properties of the salt data generated by the creep mechanical behavior tests (step 132). This approach is used because it is not possible to determine in advance which analytical model best accounts for the time-dependent viscosity characteristics of a particular salt formation. Some of the typically used analytical models are discussed later with reference to FIGS. 5A-5F. One analytical model can be used during calibration to present an accurate match with the laboratory data and to calculate engineering parameters. However, to further increase accuracy of the calculated parameters and reduce errors two or more models can be used during calibration.

After the analytical models are calibrated, the model that best fits the experimental data and the associated mechanical properties are identified. Coefficient of determination method and R-squared method are used to identify best-fit model. A wellbore closure model is implemented based on a best-fit analytical model and mechanical properties of the multiple analytical creep models to generate a relationship between drilling mud weight and casing time window for the salt formation (step 134). In some implementations, the method includes drilling a well extending through the salt formation and setting a casing through the salt formation within a casing time window based on a weight of a drilling mud used to drill the well (step 136).

The time-dependent viscosity characteristics of salt formations can be reflected by various analytical models. These methods incorporate multiple analytical models that, along with laboratory data, are integrated into one approach that enables an accurate time estimate for setting a wellbore casing in the deep salt horizon during drilling. These methods allow drilling engineers and field planners to guide the field operation based on quantitatively generated parameters. The quantitative parameters provide the drilling engineers an accurate understanding of the relationship between the completion time (i.e., a casing-setting time window) and the time-dependent mud density that they are required to maintain before the casing is fully set and the operation is completed.

FIGS. 5A-5F illustrate several creep models 180, 186, 188, 190, 192, and 194 for viscoelastic characterization of a salt formation 110. FIGS. 5A-5F illustrate the basic units of creep models such as springs and dashpots. A spring has a constant stiffness per Equation 3:

$$\sigma = k\varepsilon \qquad (3)$$

where k is the spring stiffness measured in N/m², σ is stress measured in MPa as a result of an applied force, and ε is the resulting strain. A dashpot resists motion by viscous friction. Viscous friction is a resistance of a fluid to flow. This resistance acts against the motion of any solid object through the fluid and also against motion of the fluid itself past stationary obstacles. Viscosity may be thought of as a fluid friction. Resistance generated by the movement of one body past another body with which it is in contact. In this method, the salt formation is in contact with the overlaying formations. The resulting force is proportional to the velocity but acts in the opposite direction as shown by Equation 4:

$$\sigma = \eta \dot{\varepsilon} \qquad (4)$$

where $\dot{\varepsilon}$ denotes time differentiation of strain/deformation and η is the viscosity measured in N·s/m².

Figure 5A:
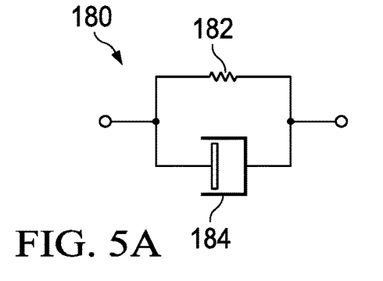
FIGS. 5A-5F illustrate several creep models for viscoelastic characterization of a salt formation.
Figure 5B:
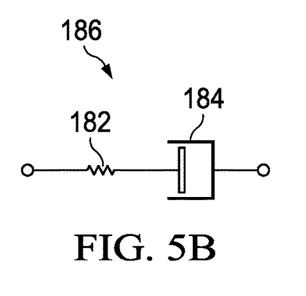
Figure 5C:
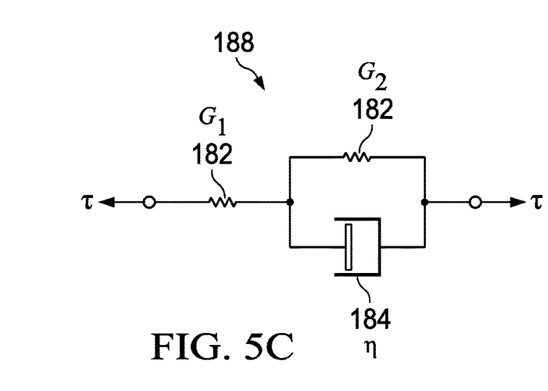
Figure 5D:
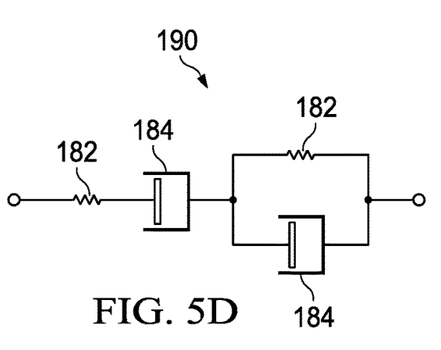
Figure 5E:
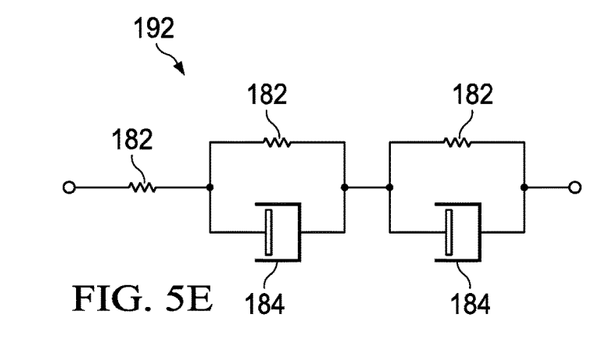
Figure 5F:
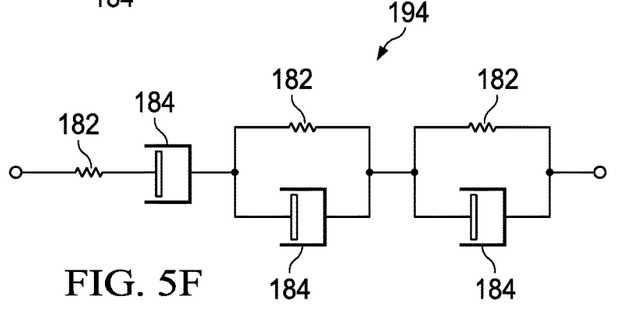

FIG. 5A shows a Kelvin model 180 which is a combination of a spring 182 and a dashpot 184 connected in parallel. FIG. 5B shows a Maxwell model 186 which is a combination of the spring 182 and the dashpot 184 connected in series. Material studied under the Maxwell model is assumed to have finite instantaneous stiffness and continuous deformation or flow at "large" times. Large time is defined as the time the strain or deformation curve takes to stabilize. For example, for salt rocks, the time can be in the order of hours, days or weeks. The Burgers model 190 (as shown in FIG. 5D) and the modified Burgers model 194 (as shown in FIG. 5F) represent mechanical behavior of a sample 146 at a "large" time. These models describe the rheological behaviors of fluid-like materials but are not highly accurate in describing mechanical response of most solid materials, such as rocks. Material studied under the Kelvin model is assumed to have an infinite instantaneous stiffness. Therefore, it is not highly accurate to estimate the mechanical behavior of materials in real application. Kelvin model is a basic model among many practical creep models such as Zener model and modified Zener model. Kelvin model is used to describe creep behaviors of polymers. The Zener model 188 (as shown in FIG. 5C) and the modified Zener model 192 (as shown in FIG. 5E) are each a combination of the Kelvin model 180 and an additional spring 182. Models 188, 192 assume finite stiffness at instantaneous moment of the material and infinite time and define rheology to take place in a determined time. These features give the models potential to accurately capture the creep behavior of a salt formation FIG. 5C shows the Zener model 188 with mechanical parameters of the spring 182 and the dashpot 184 with loading conditions. The stress-strain relationship of the model 188 may be expressed per Equation 5:

$$\gamma = \frac{\tau}{G_1} + \frac{\tau}{G_2}\left[1 - e^{-\frac{G_2}{\eta}t}\right] \qquad (5)$$

where $G_1$ is the shear stiffness of the standalone spring 182 (as shown on the left in FIG. 5C), $G_2$ is the shear stiffness of the spring 182 (as shown on the right in FIG. 5C) or as the Kelvin model 180 in FIG. 5A, γ is the deviatoric strain (i.e., axial strain), and τ is the deviatoric stress.

Figure 6:
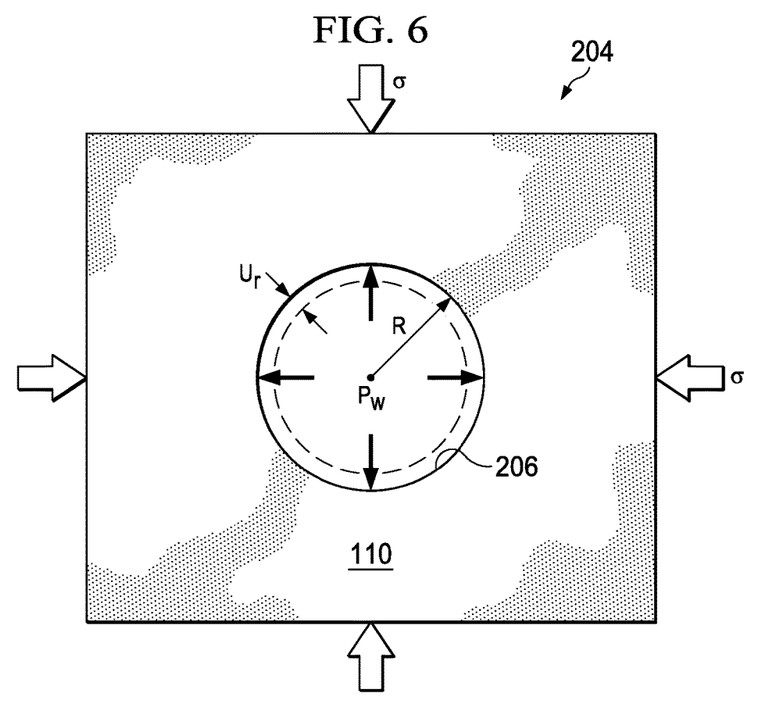
FIG. 6 is a schematic view of a wellbore closure induced by creep of a salt formation.

FIG. 6 is a schematic view of wellbore closure 204 induced by creep of a salt formation 110. The Zener model 188 was applied to best-fit the strain data measured during the laboratory creep test 154 The comparison is presented with strain-time distribution curve 162 (FIG. 4) where the solid line 168 is the Zener model prediction and the square dots are experimental data 170. Since the viscoelastic or time response of the salt formation 110 was well described by the Zener model 188, the viscoelastic mechanical parameters were determined to be $G_1$=1.816 GPa, $G_2$=0.452 GPa, and η=872 GPa·s. In the wellbore model, the difference between the in-situ stress and the mud weight 206 (i.e., wellbore pressure ($P_W$)) is the deviatoric stress. The elastic solution of a radial displacement at r around the wellbore wall (as shown in FIG. 6) is calculated per Equation 6:

$$u_r = \frac{\sigma - P_W}{2G}\frac{R^2}{r} \qquad (6)$$

where G is the shear modulus of the elastic medium. For viscoelastic medium, the corresponding principles of Abousleiman et al. 1996 are used and are incorporated in this disclosure in its entirety by reference. The displacement solution has same form as the elastic solution but differs by using another shear modulus in Equation 7:

$$u_r = \frac{\sigma - P_W}{2\overline{G}}\frac{R^2}{r} \qquad (7)$$

where $\overline{G}$ is the viscoelastic shear modulus that is determined from Equation 8:

$$\overline{G} = \frac{1}{\frac{\tau}{G_1} + \frac{\tau}{G_2}\left[1 - e^{-\frac{G_2}{\eta}t}\right]} \qquad (8)$$

Figure 7:
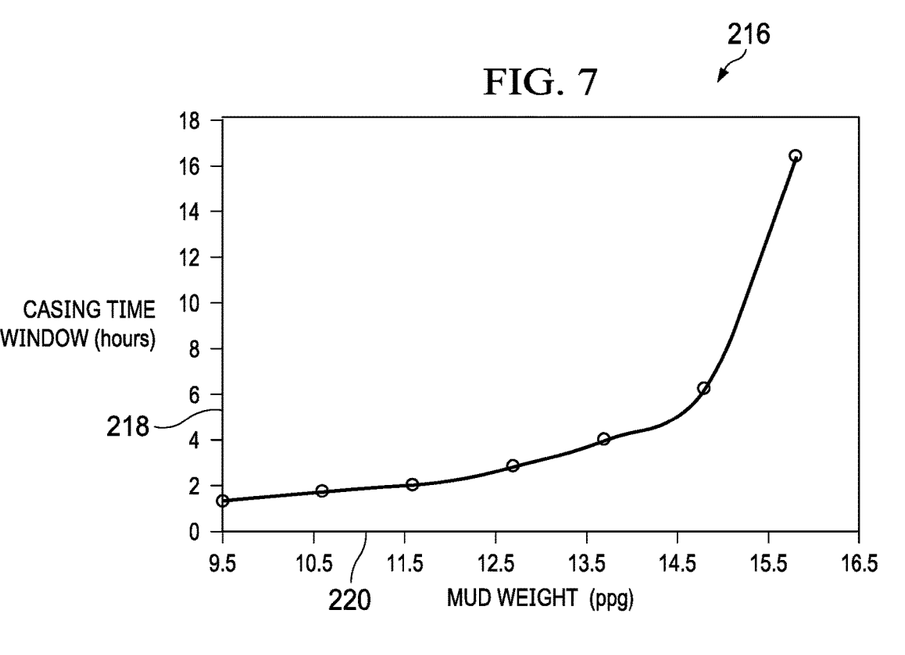
FIG. 7 is an example of a distribution curve of an estimated time window for setting a wellbore casing in a salt formation.

FIG. 7 is an example of a distribution curve 216 of an estimated time window for setting a wellbore casing in a salt formation 110. The time window to set the casing for different mud weights can be computed using Equation 7 and presented with a distribution curve 216. For example, it will take two hours to set a casing with outer diameter of 8 inches in a wellbore segment with diameter of 10 inches drilled at a depth of 13,200 feet in a salt formation under in-situ stress of 13,200 psi (91 MPa) if the mud weight of 9.5 ppg is employed during drilling. For example, for mud weight larger than 16.5 ppg in theory the time window becomes infinite but fracking and mud losses can become a potential problem. This illustrates the wellbore closure will end after moving inwards for few hours.

In summary, a method for estimating time window to set wellbore casing in a salt formation is disclosed. A realistic example was used to demonstrate the complete procedure and verify its validity in practical completion design.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for setting a wellbore casing in a subterranean formation, the method comprising:
    drilling a test wellbore in the subterranean formation;
    generating a density profile of a plurality of geological layers above a salt formation in the subterranean formation based on observations from the test wellbore;
    calculating an overburden stress imposed on the salt formation by weight of overlying formation based on the density profile of the plurality of geological layers;
    performing creep mechanical behavior tests on core samples from the salt formation to generate a strain-time curve for the salt formation;
    calibrating multiple analytical creep models with mechanical properties of the salt data generated by the creep mechanical behavior tests;
    implementing a wellbore closure model based on a best-fit analytical model and mechanical properties of the multiple analytical creep models to generate a relationship between drilling mud weight and casing time window for the salt formation; and
    drilling a well extending through the salt formation and setting a casing through the salt formation within a casing time window based on a weight of a drilling mud used to drill the well.

2. The method of claim 1, wherein the calculating of the overburden stress further comprises relating the density profile of the plurality of geological layers with an underground depth z and acceleration of gravity g.

3. The method of claim 2, wherein the calculating of the overburden stress further comprises setting a reference depth to zero.

4. The method of claim 2, wherein the calculating of the overburden stress further comprises setting a maximum horizontal principal stress and a minimum horizontal principal stress to be equal to the overburden stress.

5. The method of claim 1, wherein performing the creep mechanical behavior tests on the core samples further comprises defining an in-situ stress and a temperature to impose deformation on the salt formation.

6. The method of claim 1, wherein performing the creep mechanical behavior tests on the core samples further comprises defining an isotropic confining stress in an axial and in a radial direction.

7. The method of claim 6, wherein performing the creep mechanical behavior tests on the core samples further comprises increasing the axial stress in a step-wise pattern.

8. The method of claim 1, wherein calibrating the multiple analytical creep models further comprises selecting models including springs and dashpots.

9. The method of claim 8, wherein multiple analytical creep models include a Kelvin model, a Maxwell model, a Burgers model, a modified Burgers model, a Zener model, and a modified Zener model.

10. The method of claim 1, wherein implementing a wellbore closure model further comprises defining a difference between an in-situ stress and the mud weight as a deviatoric stress.

11. The method of claim 1, wherein drilling the well extending through the salt formation comprises selecting the drilling mud based in part on a time required to set the casing through the salt formation.

12. A method for determining a time window for setting a wellbore casing in a salt formation, the method comprising:
    calculating an overburden stress imposed on the salt formation by weight of overlying formations based on a density profile of a plurality of geological layers above the salt formation;
    performing creep mechanical behavior tests on core samples from the salt formation to generate a strain-time curve for the salt formation;
    calibrating multiple analytical creep models with mechanical properties of the salt data generated by the creep mechanical behavior tests;
    implementing a wellbore closure model based on a best-fit analytical model and mechanical properties of the multiple analytical creep models to generate a relationship between drilling mud weight and casing time window for the salt formation; and
    selecting a drilling mud based in part on a time required to set the casing through the salt formation.

13. The method of claim 12, wherein the calculating of the overburden stress further comprises relating the density profile of the plurality of geological layers with an underground depth z and acceleration of gravity g.

14. The method of claim 13, wherein the calculating of the overburden stress further comprises setting a reference depth to zero.

15. The method of claim 13, wherein the calculating of the overburden stress further comprises setting a maximum horizontal principal stress and a minimum horizontal principal stress to be equal to the overburden stress.

16. The method of claim 12, wherein performing the creep mechanical behavior tests on the core samples further comprises defining an in-situ stress and a temperature to impose deformation on the salt formation.

17. The method of claim 12, wherein performing the creep mechanical behavior tests on the core samples further comprises defining an isotropic confining stress in an axial and in a radial direction.

18. The method of claim 12, wherein calibrating the multiple analytical creep models further comprises selecting models including springs and dashpots.

19. The method of claim 18, wherein multiple analytical creep models include a Kelvin model, a Maxwell model, a Burgers model, a modified Burgers model, a Zener model, and a modified Zener model.

20. The method of claim 12, wherein implementing a wellbore closure model further comprises defining a difference between an in-situ stress and the mud weight as a deviatoric stress.

* * * * *